(12) United States Patent
Stanton et al.

(10) Patent No.: US 10,679,186 B2
(45) Date of Patent: Jun. 9, 2020

(54) CLIENT DRIVEN APPLICANT TRACKING SYSTEM AND ASSOCIATED METHOD TO MANAGE MULTIPLE JOB REPORTS

(71) Applicant: Job Search Television Network, Inc., Geneva, IL (US)

(72) Inventors: Roger John Stanton, Geneva, IL (US); Lindsay Stanton, Geneva, IL (US)

(73) Assignee: Job Search Television Network, Inc., Geneva, IL (US)

( * ) Notice: Subject to any disclaimer, the term of this patent is extended or adjusted under 35 U.S.C. 154(b) by 804 days.

(21) Appl. No.: 14/223,600

(22) Filed: Mar. 24, 2014

(65) Prior Publication Data

US 2015/0269527 A1 Sep. 24, 2015

(51) Int. Cl.
*G06Q 10/10* (2012.01)
*G06Q 10/06* (2012.01)

(52) U.S. Cl.
CPC ......... *G06Q 10/1053* (2013.01); *G06Q 10/06* (2013.01)

(58) Field of Classification Search
CPC ............................ G06Q 10/1053; G06Q 10/06
See application file for complete search history.

(56) References Cited

U.S. PATENT DOCUMENTS

| 5,649,046 A | 7/1997 | Stewart et al. |
| 7,404,177 B1 | 7/2008 | Greenfield et al. |
| 2006/0036647 A1 | 2/2006 | Fichtner et al. |
| 2006/0167686 A1 | 7/2006 | Kahn |
| 2007/0260968 A1 | 11/2007 | Howard et al. |
| 2009/0228323 A1 | 9/2009 | Ebrahimian |
| 2010/0235748 A1 | 9/2010 | Johnson et al. |
| 2011/0060996 A1 | 3/2011 | Alberth, Jr. et al. |
| 2012/0132701 A1 | 5/2012 | Nakagawa et al. |
| 2012/0182384 A1 | 7/2012 | Anderson et al. |
| 2012/0215738 A1 | 8/2012 | Wilton |
| 2012/0330708 A1 | 12/2012 | Khan |
| 2013/0060711 A1 | 3/2013 | Dachenhaus et al. |

(Continued)

FOREIGN PATENT DOCUMENTS

WO 2014014883 A1 1/2014

OTHER PUBLICATIONS

Jobvite Video website. <https://www.jobvite.com/products/jobvite-video/> Oct. 7, 2013. accessed Apr. 7, 2020. (Year: 2013).*

(Continued)

*Primary Examiner* — Tamara Griffin
*Assistant Examiner* — Shaun D Sensenig
(74) *Attorney, Agent, or Firm* — Duane Morris LLP

(57) ABSTRACT

The present disclosure relates to an automated process and associated computerized system and method implemented over an automated system for generating Job Reports for different job offers of employers, where the new process and associated system allows an employer to customize template Job Reports with one or more of different fields using a cloud-based Application Programming Interface (API). The system further includes a fully integrated system to interface with an employer's Applicant Tracking System (ATS) designed to help employers track multiple new features associated with the customized Job Reports generated and make alterations that do not require production time.

1 Claim, 6 Drawing Sheets

(56) References Cited

U.S. PATENT DOCUMENTS

2013/0066796 A1\*  3/2013  Shin .............. G06Q 10/063118
                                              705/321
2013/0067027 A1    3/2013  Song et al.
2013/0191299 A1    7/2013  Hermsdorff et al.
2013/0317998 A1\*  11/2013 Chen ................. G06Q 10/1053
                                              705/321

OTHER PUBLICATIONS

International Search Report and Written Opinion issued in PCT/US15/20869 dated Jun. 23, 2015, 10 pages.
European Search Report dated Jun. 22, 2017 issued in connection with PCT/US2015/020869; 7 pages.

\* cited by examiner

FIG. 5

ATS API

Choose an ATS Partner and view the API data. Questions? Contact Us.

ATS Partner: Kenexa

API Feed URL: http://myjsn.com

API Feed Username: Test2

API Feed Password: Test3

EDIT

OR

Bulk Insert

You can upload new jobs in bulk with a XML Document. Questions? Contact Us.

XML File: Browse

SUBMIT

CLIENT DRIVEN APPLICANT TRACKING SYSTEM AND ASSOCIATED METHOD TO MANAGE MULTIPLE JOB REPORTS

FIELD OF THE INVENTION

The present disclosure relates to an automated process and associated computerized system implemented over an automated system for generating Job Reports for different job offers of employers, where the new process and associated system allows an employer to customize template Job Reports with one or more of different fields using a cloud-based Application Programming Interface (API). The system further includes a fully integrated system to interface with an employer's Applicant Tracking System (ATS) designed to help employers track multiple new features associated with the customized Job Reports generated and make alterations that do not require production time.

BACKGROUND OF THE INVENTION

Job Search Television Network, Inc. is the leading service provider of talent-based video productions for job openings. In 2010, it first filed a provisional patent application No. 61/317,354 entitled System and Method for Providing Visual Job Information and Job Seeker's Information. This provisional was used as template for the filing on Mar. 25, 2011 of U.S. Ser. No. 13/071,610, also entitled System and Method for Providing Visual Job Information and Job Seeker's Information, and on Jul. 17, 2012, U.S. Ser. No. 13/551,404, also entitled System and Method for Providing Visual Job Information and Job Seeker's Information.

Both non-provisional applications describes a platform used by an employer to generate a Job Report made of two overlaid segments, a video read by an on-air talent from a teleprompter reading a graphic form of a job offer, and multiple textual elements around the talent generated from a script (i.e. the 'Skin'). What is also described is the system used by applicants once they have viewed a Job Report to record a video feed in response. FIG. 1 is taken from both U.S. Ser. No. 13/071,610, and Ser. No. 13/551,404, of the prior art and illustrates the Job Report. FIG. 2 is taken from both of these applications and shows the system associated with the recording of the responsive video fee. These three applications are incorporated herein fully by reference.

As explained in these references, as each job opening differs and the unique and necessary qualifications for each posting differ, it may be difficult for potential applicants to distinguish certain requirements that are essential to the opening from other requirements that are used to give a profile of what may be a good applicant. In the pre-internet era, employers used newspapers ads to post new openings. A human resource manager would make an executive decision as to the publication in different newspapers, covering different geographical areas, and this manager would also decide the size of the posting and the font size for each requirement. Job seekers by looking at the ad and the newspaper reputation would get some type of information as to which requirement will be strictly observed, and which will generally be useful to get a position. Other types of venues for job postings included small job related publications, and local television channels offering wanted ad services. In each case the distribution of the job offer was limited in its potential to reach qualified candidates and distinguish between the essential job requirements from secondary job requirements.

Today with the arrival of the internet and other types of online or wireless communications, job seekers are bombarded with text-based job descriptions. In this fluid format of information, it may be very difficult to distinguish between essential job requirements and secondary job requirements, it is also difficult to distinguish between important ads posted by employers and less important ads as these may be posted side by side on a board or list. Also employers now hire human resource directors in one geographical location responsible for job listings around the country and for multiple branches and divisions that may often be extremely similar job requirements. What is needed is a system capable of adapting to the new requirements of human resources directors having to manage hundreds of very similar job postings, managing applicants on each job and being able to quickly conduct a triage and associated statistical reporting for each job offer posted.

Today, most large corporations used one version of a software application called an Applicant Tracking System (ATS) that enables electronic handling of recruitment needs. These software allows applicants to upload resumes and include filters to automatically triage based on criteria such as former employers, years of experience and schools attended. These AST may work alongside a human resources suite also known as a Human Resource Information System (HRIS). These ATS include a database of a company's recruitment efforts. A majority of job and resume boards like Monster®, Hotjobs®, Career Builder® have partnerships with leading ATS software providers to provide parsing support and easy of data migration from one system to another.

Some of the current leading ATS software providers include software branded as ADP®, All-In-One®, AspireHR®, Beeline®, Brainhunter®, Brassring®, Careerbuilder®, Ceridian®, CyberRecruiter®, and Deploy® to name a few. Associated with each of these ATS software are generally a URL where data is located/uploaded. For example, a corporation may use the ATS software from ADP® in association with a dedicated webpage on the website Careerbuilder.com. Associated with each clients is an ATS software linked with an API/Feed URL, a username and a password given to access the site.

Currently, the technology available to job posters, each owners of their respective ATS interface is case-by-case system to upload a text file associated with one job position and using the system to generate one video feed that is then uploaded back into the proprietary ATS software either directly as an image file, or as a web-based dynamic link to be displayed on any URL page for importing a streamed version of the image file.

What is needed is a client drive system capable of working alone as an ATS or alongside a client proprietary ATS system to help generate and manage multiple video feeds each associated with multiple job postings.

BRIEF SUMMARY OF THE INVENTION

An exemplary embodiment of the present application is a system and associated method used to manage, customize, and produce multiple a high quality visual or video representations ("Job Reports") from a text-based job descriptions provided by employers and/or recruiters relating job openings. The system includes system for customizing up to two dozens of different features of an already produced Job Report, to adapt the Job Report to a new yet highly similar job opportunity using for example a cloud based API user interface to allow these real-time changes to take into effect.

The system also includes client video depository database to allow indexing on different parameters (i.e. start date, video ID number, position title, or location), generate a link to be embedded in multiple formats (i.e. video link, JS Embed, Iframe, HTML, or HTML2), to update the status of the video (public, private, interactive), to alter distribution, or to edit the video text display on the Job Report around the main talent (i.e. the 'Skin').

The system also includes a way to generate new videos and enter manually the information to be sent for the production of the Job Report, including placing key META information associated with the Job Report to be produced. A third portion of the system allows for key metrics associated with each Job Report and associated posting to be used, either simply as a view/apply metric, or more precisely by generating a report with detailed information about each viewer of the Job Report and each applicant to the position.

Finally, in cases where multiple Job Reports are being created, the interface allows for either a bulk insert of an XML format file, or the designation of an ATS partner from a scroll down list, along with the location where the instruction data is uploaded and downloaded using an API.

BRIEF DESCRIPTION OF THE DRAWINGS

FIG. 5 is a screen shot illustration of the video depository and edit module of the applicant tracking system platform and system according to an embodiment of the present disclosure.

FIG. 6 is a screen shot illustration of the bulk video data entry module of the applicant tracking system platform and system according to an embodiment of the present disclosure.

DETAILED DESCRIPTION OF THE INVENTION

Figure 1:
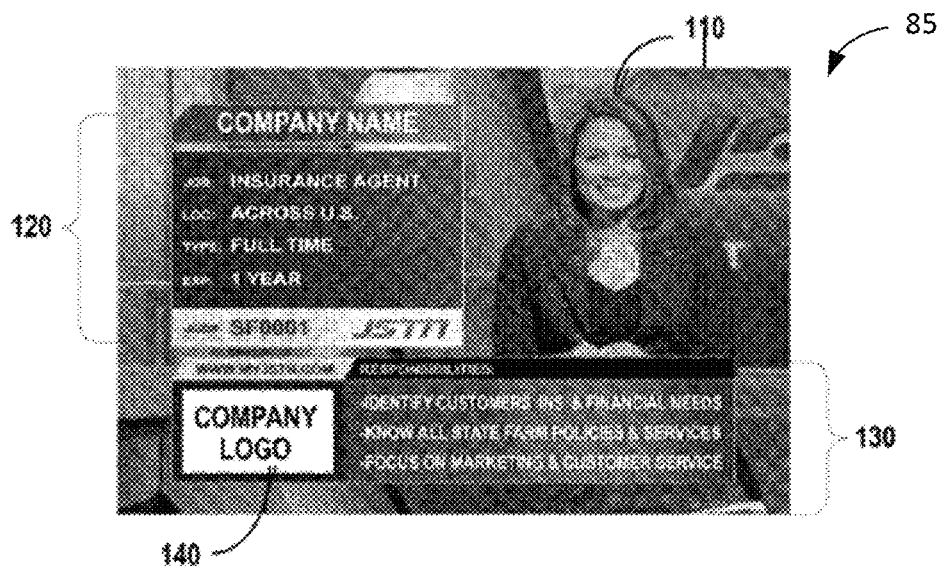
FIG. 1 is a figure from the Prior Art illustrating the Job Report.
Figure 2:
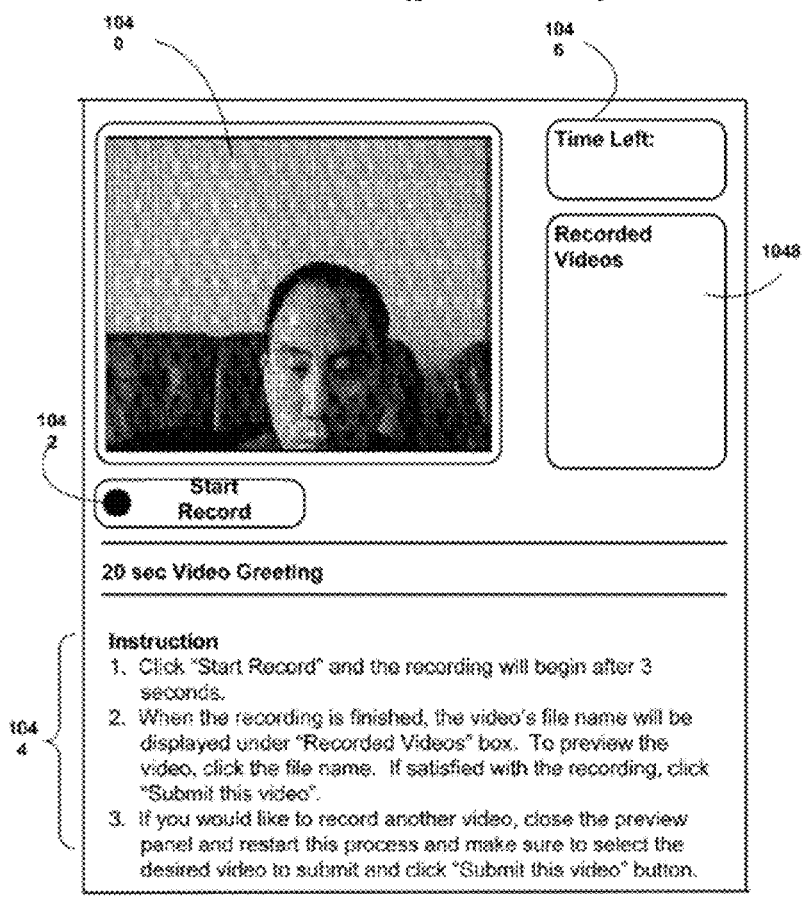
FIG. 2 is a figure from the Prior Art illustrating an applicant's response to a Job Report of FIG. 1.

FIG. 1, taken from the prior art, is a screen shot of one of the frames of an exemplary Job Report 85. The inventions described at in the prior art as U.S. Ser. No. 13/071,610, and Ser. No. 13/551,404, and incorporated fully by reference herein, allows the generation of a Job Report 85 specific and customized to an individual job opening at a client. The Job Report 85 may have a predetermined fixed length of time or a variable length of time depending on the job description provided by an employer. For optimal viability and broadcast over the web, the Job Report 85 may be fixed, for example, at 30 seconds in length. As part of the Job Report 85 of FIG. 1, the job description may be as shown partly delivered by an on-air talent 110 in a network news style. While one type of delivery is shown, one of ordinary skill in the art will appreciate that other types of delivery styles aside from the network news style may be used. The on-air talent 110 may first introduce a job listing while relevant position information is displayed as shown at 120, 130 on the side and/or bottom of the screen as shown. The text on the screen, also described here as the 'skin' may contain the employer or company's logo 140, a posting number, and key statistics about the company and the job positions available. The Job Report 83 as shown at FIG. 1 may include several graphic areas 120 and 130 displayed at different portions of the screen.

Figure 3:
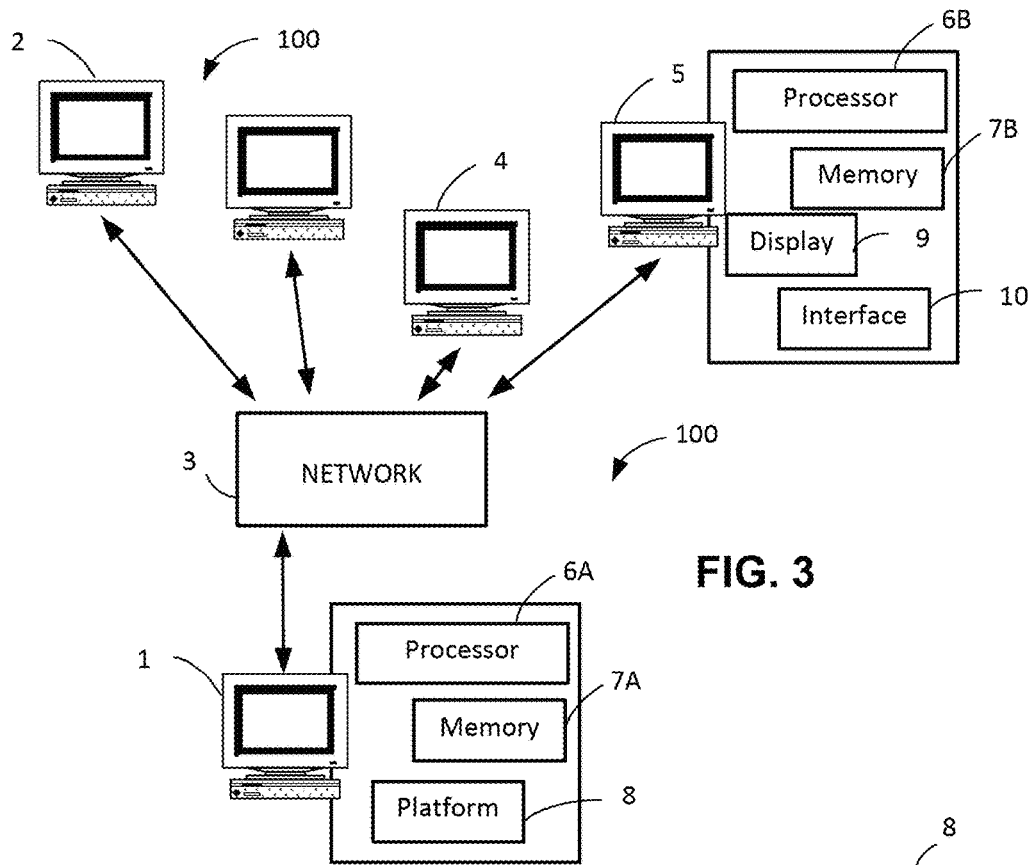
FIG. 3 is one possible embodiment of the hardware for hosting the client driven applicant tracking system for the management of Job Reports as described in FIGS. 4 to 8 of the present disclosure.
Figure 4:
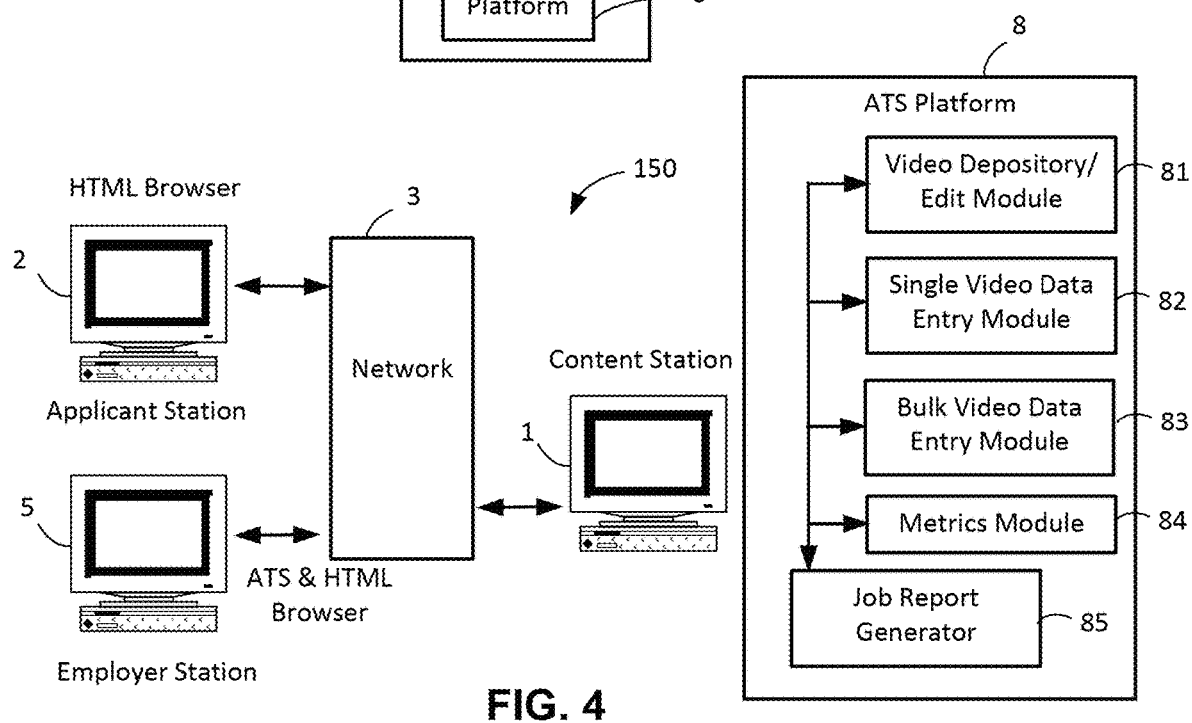
FIG. 4 is a flow chart of the different software elements of the client driven applicant tracking system, according to an embodiment of the present disclosure.

As is every computer enabled software platform, the system relies on hardware shown generally at FIG. 3, to allow the different modules and elements of software as shown at FIG. 4 to operate and interconnect. One of ordinary skill in the art of software development will understand how the hardware system evolves and is made to be more portable and more efficient using multiple new types of devices on which new generations of operating systems and programming systems are enabled.

FIG. 3, as is the case with most software applications of modern age, a platform and system 100 generally includes multiple computers 1, 2, each connected either via modem, a wireless router, a cell phone network, or any other way to one of multiple existing networks 3, such as for example the Internet. Other computers 4, 5, serving a different use are then also connected in a similar way to the network 3. With time, the network distribution changes, the type of computer or computing device changes, but in each a processor 6A, 6B, is connected to a memory 7A, 7B, in which an operating system runs different layers of software to execute the different software applications needed to run the currently disclosed application. One of ordinary skill in the art of network architecture and computer science will understand that while one structure is disclosed at FIG. 3, any number of structures is contemplated.

Also shown at FIG. 3, some computers 1, such as for example a server can include a software platform 8 running the main kernel of software for an application. On the other computers, a display 9, and an interface 10 can be used to use the platform 8. Currently, many software will use a local HTML browser software installed on the computers 2, 4, or 5, and their associated displays and interfaces, for example tablets, cell phones, portable or fixed computers with a commercial browser tool such as Internet Explorer® or Mozzilla® to exchange information in the form mostly of HTML script and data linked with the HTML script and display based on the format of the browser locally. The platform software 2, while programmed in any of multiple programming languages, relying on any of multiple database tools, can be made to read and generate content that can be accessed by the remote HTML browsers.

As part of the system 100 described at FIG. 3, computer 1 can be used, for example, to house the webserver and computer database capable of generating the Job Reports 85 of FIG. 1, and storing Job Reports 85, and other information for multiple clients. The computer 1, for example can have a web address such as www.myjstn.com, at which the different Job Reports 85 can be stored base on any of multiple sorting parameters. The computer 1, can also house a large software platform 8 capable of running the software described fully hereafter. One of ordinary skill in the art will understand how software can be generated to link and exchange information between different computers over a network. A job applicant may use a first computer 2, to play a Job Report 85 posted on the servers of Career Builder® at computer 4, placed there by a customer using computer 5, and having set up a path for the Job Report 85 residing the memory 7A to play directly on computer 2, via computer 4 upon request of a job applicant. The same way, the information about the job applicant using computer 2 can travel back to computer 1 for storage of data.

FIG. 4, shows generally a possible software layer configuration as it may be found on the system 100 shown at FIG. 3. The network 3 operating generally as a web of interconnected servers using different protocols of communication allows as shown in one embodiment to transfer HTML script between an HTML browser installed on an applicant station 2 (i.e. a person looking for a job), an employer station 5 where an ATS software and an HTML interface is mounted and ultimately connected to a content station 1 where the ATS platform 8 resides. As shown at FIG. 4, the ATS platform 8 can rely on existing tools to generate the Job Report 85 as described fully in the inventor's previous pending application Ser. No. 13/071,610, and Ser. No. 13/551,404, incorporated herein fully by reference.

In one possible embodiment, the ATS platform 8 includes several software modules each connected to the Job Report Generator 85, such as a video depository/edit module 81, described with greater detail hereafter, a single video data entry module 82, described with greater detail hereafter, a bulk video data entry module 83, described with greater detail hereafter, and a metrics module 84, also described with greater detail hereafter. What is contemplated is the use of tabs and other software functions for a user of the ATS platform 8 to navigate between the different modules, and also to protect access to part or all of the module functions using encryption and/or password and associated identity code managements.

Figure 5:
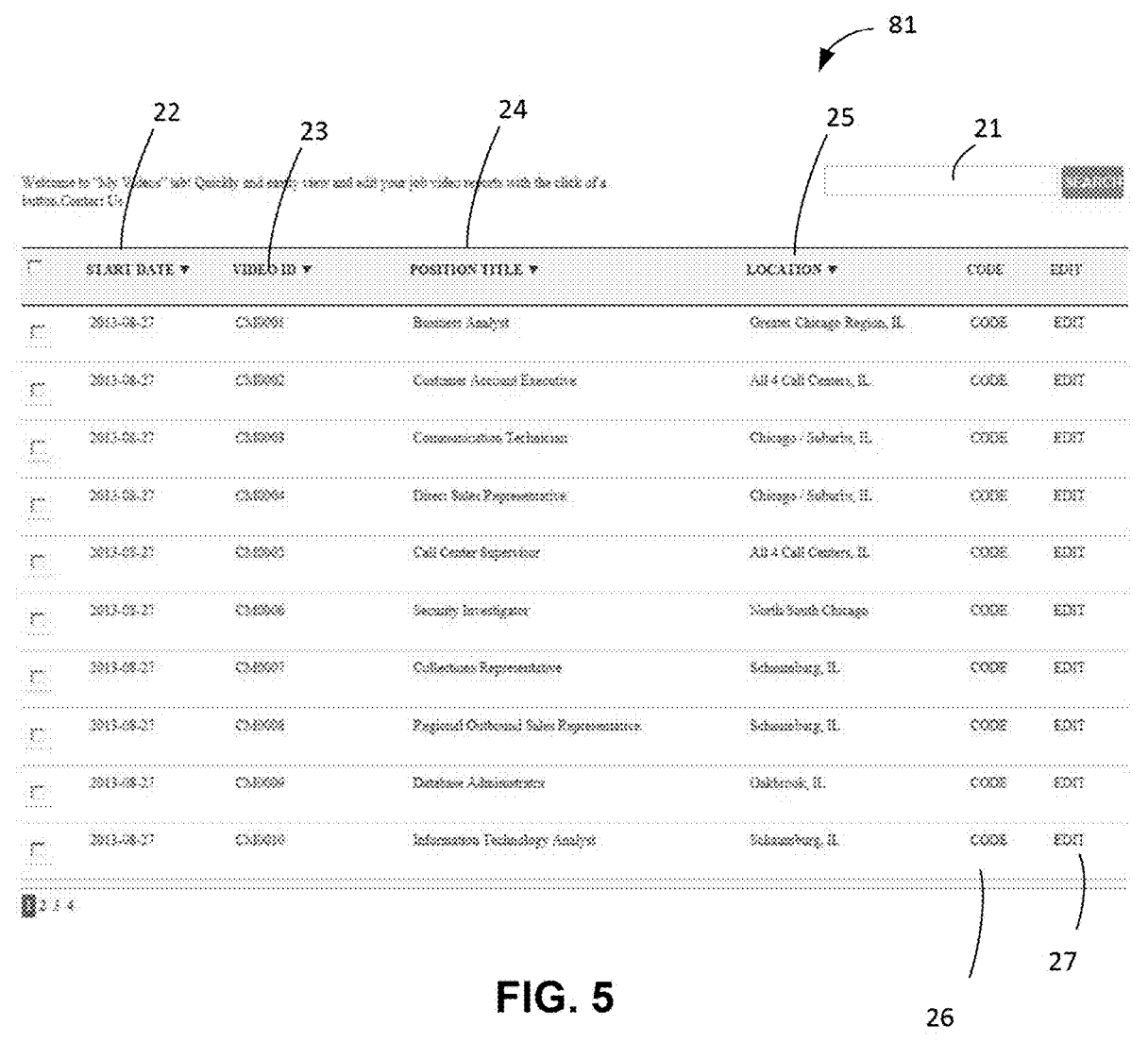

FIG. 5, is illustrative of one possible embodiment of the video depository/edit module 81 as shown at FIG. 4. Once one or more video are generated by the Job Reports module 85, either at the request from modules 82 (single), or 83 (bulk), they then appear as line items as shown at FIG. 5. A search button 21 allows a general indexing and research of any one of the multiple entries found and displayed to the job poster in this module 81. With each Job Report (here shown as different lines), the Job Report is given a start date 22 (i.e. when it was first produced/aired), a video ID number 23, shown here as CM0001 to CM0007. Other fields can be used to index these different Job Report listed, for example a title 24, or the location where the job posting is offered 25. While a handful of fields are shown, what is contemplated is the use of any field associated with a Job Report.

As shown, the video depository/edit module 81 includes two other fields 26, 27. The first shown as CODE 26 once touched opens a window where several links are given to programmers to help merge the associated Job Report 85 into different sources for broadcast. For example, in regards to the first video clip with the ID 23 of CM001, the following links can be generated:

```
Video Link  http://www.myjstn.com/jobs/IT/Comcast/Business%20Analyst/CM0001
JS Embed    <script type="text/javascript"
            src="http://www.myjstn.com/lib/js/v201112011973.js">
            </script>
            <script type="text/javascript"
            src="http://www.myjstn.com/lib/js/embedconnect_ci.js">
            </script>
            <div id="jstn_container">Loading the player ..</div>
            <script type="text/javascript">fl(500,400,"CM0001");
            </script>
Iframe      <iframe src="http://www.myjstn.com/out_track/flv2/job/CM0001"
            frameborder="0" width="100%" height="100%">
            </iframe>
HTML        <a href="http://www.myjstn.com/out_track/flv/job/CM0001" target="_blank">
            <img src="http://www.myjstn.com/images/videoSkin/CM0001.jpg"
            width="350" height="252" border="0" />
            </a>
HTML2       <a
            href="http://www.myjstn.com/jobs/IT/Comcast/Business%20Analyst/CM0001"
            target="_blank">
            <img src="http://www.myjstn.com/images/videoSkin/companyinsight.jpg"
            width="350" height="252" border="0" />
            </a>
```

In each of these formats, a user can then simply lift this script adapted to one of the different protocols (i.e. video link, JS Embed, Iframe, HTML, or HTML2). While five different protocols are given, one of ordinary skill in the art will understand the video depository/edit module 81 is designed to generate code script for any possible format in which a user may need the script. This script allows programmers of web pages or other different applications to lift this code (i.e. copy) onto other pages where once the browser executes the script, the Job Video with the ID CM0001 will be used and used.

In some cases, a user will require multiple different Job Reports to be negated for closely related positions. For example, the same position, with a slightly different salary may be offered in two different locations. In such cases, by simply changing the text portions around the main talent on-air read, a new Job Report can be generated without the need to use the studio. The EDIT function 27, opens a different page where multiple fields. Currently, the EDIT function 27 is divided into three segments, the basic information, the Meta Information, and the 'Skin' information (i.e. the text portion associated with the Job Report). The basic information can include for example (a) the client's name as a company using the Job Report, (b) the ID 23 of the Job Report, and (c) the choice of a Client's internal ATS used by the client. The Meta information can include (a) Meta Keywords, and (b) Meta Descriptions.

The different fields of the skin are listed on the left side column of the table below and an example choice/text is given on the right side column.

| | |
|---|---|
| Language | Drop Down Option [English, Spanish] |
| Category | Drop Down Option [Accounting, Administrative, Communications, Customer Services, Education, Engineering, etc . . .] |
| Company | Drop Down Option [. . . client names using the software . . .] |
| Type | Drop Down Option [Part time, Full time, Intern, etc . . .] |
| Title | Typed Text [Business Analysis] |
| Location | Typed Text [Greater Chicago Region, IL] |
| Education | Typed Text [College/University] |
| Experience | Typed Text [BA/2-5 Years Exp./Computer Skills] |
| Responsibilities | Typed Text |
| Brief Description | Typed Text |
| Apply Link | HTML link connected to a site or ATS of the client [http://www.myjstn.com/page/closed/?cid=2&furl= http://www.comcast.com/Corporate/About/Careers/ careers.html] |
| Written Description | Editing Tools Typed Text Box |
| Job Page | Editing Tools Typed Text Box |

The single video data entry module 82 as shown at FIG. 4, in one embodiment currently contemplated includes all of the information provided above for the module 81, with additional fields as part of the basic information. First, the ID of the new video to be created includes a more complex job number that keys in several parameters of the modification, for example include the year, and other key parameters (i.e. ID CO2014022013325153). Also a status can be attached to the Job Report once it will be produced by the Job Reports module 85. For example, this status can include 'active,' or 'inactive.'

FIG. 6, illustrates one possible embodiment of the a bulk video data entry module 83 of FIG. 4. As explained, most clients having a voluminous desire in job postings to be filled, will have a requirement for numerous Job Reports to be generated by the system, often for a list of positions within the employer. For example, a client in the field of engineering may have different levels of engineers (beginner, mid-entry level, senior level) and each will be associated with a different compensation and functional requirements. These clients will have their own ATS to manage these job openings, job postings, and the statistics associated with them. As shown at FIG. 6, either a user uploads all of the new jobs in one bulk XML format document 41, or uses the ATS API 42, by enting the type of ATS to be used 43, the source of the feed 44 associated with a log in username 45, and password 46. Generally speaking, the crawler type ATS API activated will use the username and password to enter a the feed URL and grab the new job offers present on the ATS based on parameters that may be defined.

Figure 7:
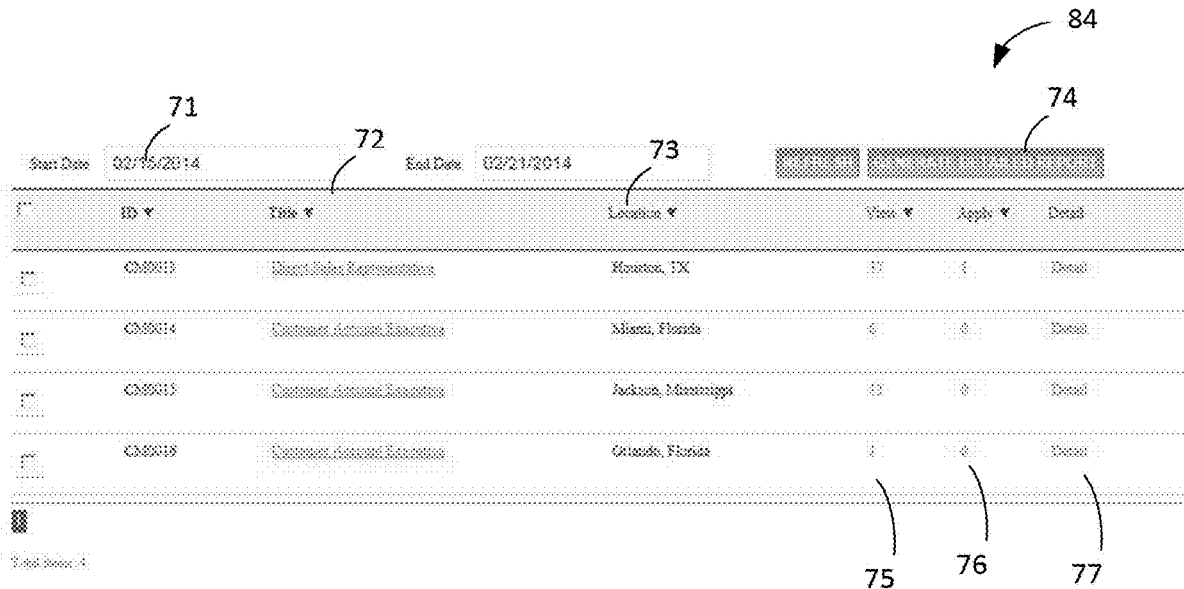
FIG. 7 is a screen shot illustration of the metrics module of the applicant tracking system platform and system according to an embodiment of the present disclosure.
Figure 8:
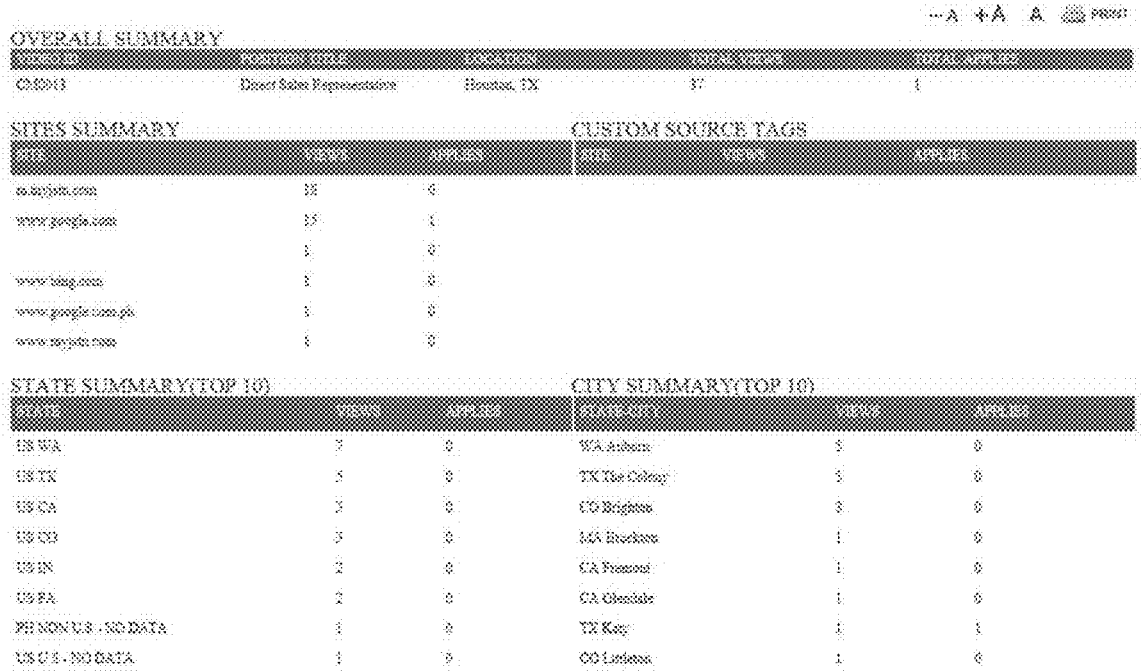
FIG. 8 is an illustration of a detail report generated from the metrics module of the applicant tracking system platform and system according to an embodiment of the present disclosure.

Finally, the last module shown at FIG. 4 is directed to a metrics module 84 as shown with greater detail at FIG. 7. In the case of job employment, while the ATS of the different clients can manage how many times an applicant responds to a posting, the system can monitor the viewing information of the Job Report. For example, as shown, a report can be pulled for a specific week listing several Job Reports using ID numbers 71, titles 72, and locations 73. Each is then assigned with a number of views 75, a number of applicants 76, and a button 77 to get detailed information about the statistics. The information can be broken down for each video as shown at FIG. 8. For each different job posting, the report may include an overall summary, a site summary (i.e. the number of views per site where the video resides), custom source tags, state determination of viewers, city of viewing breakdown, etc.

The present disclosure relates to an automated process and associated computerized system implemented over an automated system for generating Job Reports for different job offers of employers, where the new process and associated system allows an employer to customize template Job Reports with one or more of different fields using within a network such as a cloud-based Application Programming Interface (API). The system further includes a fully integrated system to interface with an employer's Applicant Tracking System designed to help employers track multiple new features associated with the customized Job Reports generated and make alterations that do not require production time.

As shown in the figures and described above is a system for the management and the generation of multiple Job Reports (one Job Report shown as FIG. 1), and distributing the Job Report in a network environment as shown at FIG. 3. The system includes a job seeker computer 2 connected to a network 3 for accessing and displaying a Job Report 85 of an employer and for applying to a job posting associated with the Job Report 85. The system also includes an employer computer 5 connected to the network 3 for requesting a generation and for a management of a plurality of Job Reports as shown at FIG. 5 for an employer, including the Job Report associated to the job posted of the job seeker, the employer computer 5 including an employer Applicant Tracking System (ATS) as shown at FIG. 4, and a server computer 1 connected to the network 3 for generating at the request of the employer computer using a ATS Platform the plurality of Job Report in interface with the Applicant Tracking System of the employer computer. The ATS Platform 8 as shown at FIG. 4 can include a video depository and edit module 81, a single video data entry module 82, and a bulk video data entry module 83.

In an alternate embodiment, the system can also include a metrics module 84. As shown at FIG. 4, the video depository and edit module 81, the single video data entry module 82, the bulk video data entry module 83, and the metrics module 84 are each connected to a Job Report Generator 85 for creating a plurality of Job Reports, and including the Job Report associated with the job posting of the job seeker. The network can in some embodiment be the internet, the server computer a webserver for producing HTML script, and the job seeker computer and the employer computer included an HTML interface for reading the HTML script from the server computer.

Figure 9:
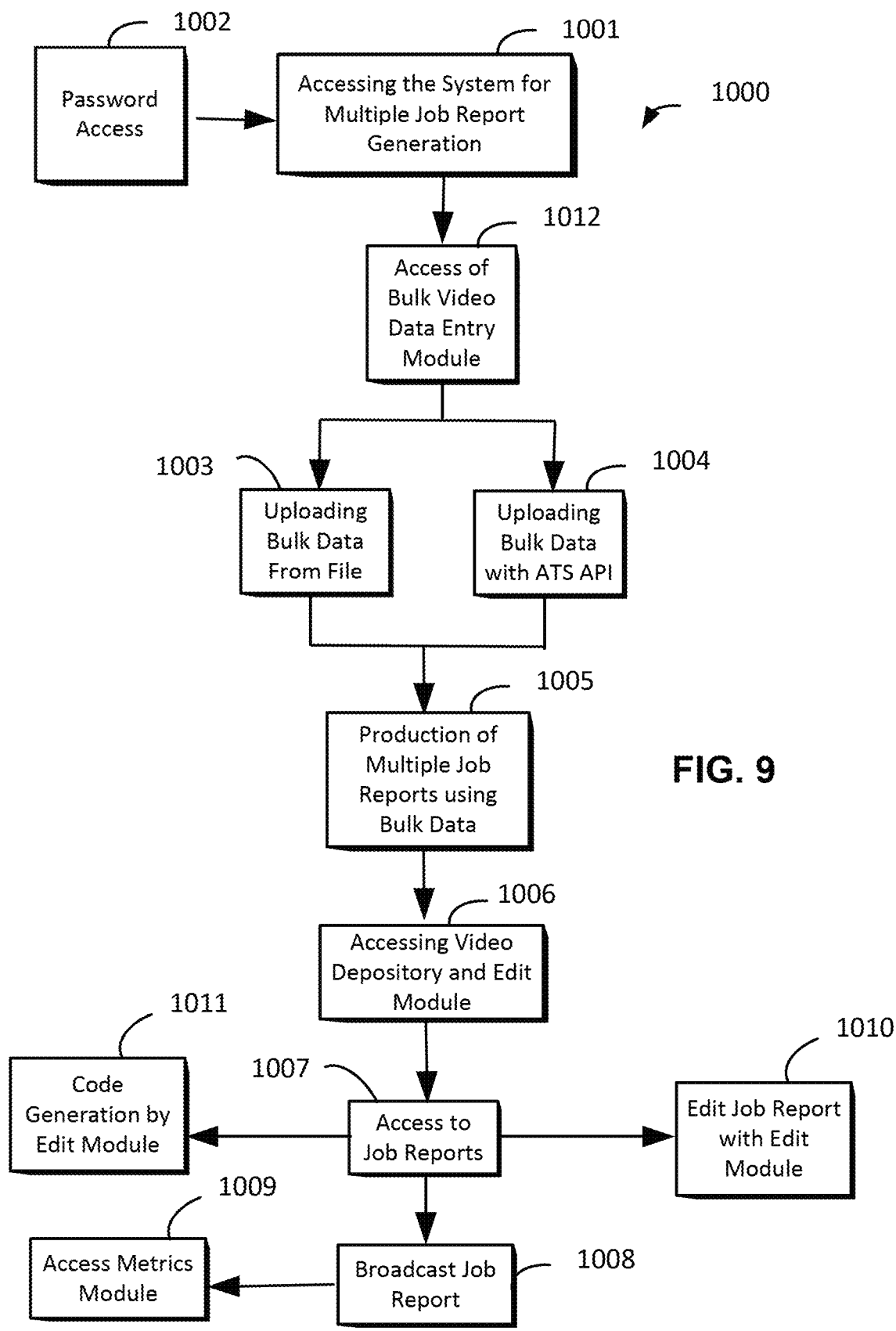
FIG. 9 is an illustration of a method for managing a plurality of Job Reports for an employer according to an embodiment of the present disclosure.

What is shown at FIG. 9, is a method 1000 for managing a plurality of Job Reports for an employer having a plurality of job openings. The method may or may not rely on the system as described above. As shown at FIG. 9, the method includes the steps of accessing 1001 using an employer computer via a network a system for the management and the generation of multiple Job Reports on a server computer, wherein the step of access includes an access to a private employer specific account for an employer having a plurality of job openings using a passcode 1002, accessing 1012 a bulk video data entry module, uploading from the employer computer 1003, 1004 to the server computer bulk data relating to a plurality of job openings of the employer, producing 1005 using a Job Report Generator one Job Report for every job opening of the plurality of job openings of the employer, accessing 1006 a video depository and edit module for access each of the Job Report produced by the Job Report, and broadcasting 1008 at least one Job Report from the video depository and edit module over the network to a potential job applicant. The step of uploading bulk data includes the step of selecting between uploading a file 1003, and using an ATS API 1004. As shown, the method can also include the step of accessing 1009 a metrics module to generate a report. In a different step, the video depository and edit module can be used to edit an existing Job Report 1010 to generate a new Job Report related to a new job opening of the employer, or to generate 1011 a code for use by the employer for accessing the Job Report from a different computer.

Since certain changes may be made without departing from the scope of the present implementation, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present implementation and that the illustrations contained herein are singular examples of a multitude of possible depictions of the present implementation.

What is claimed is:

1. A system for the generation of multiple Job Reports for closely related positions, and for the distributing of the Job Reports for closely related positions in a network environment, the system comprising:
    a job seeker computer connected to a network for accessing and displaying a Job Report of an employer associated with a desired job posting, and for applying by the job seeker computer to the desired job posting associated with the Job Report;
    an employer computer connected to the network for requesting a generation of a plurality of Job Reports each with a different skin for closely related positions and for a management of the plurality of Job Reports for closely related positions for an employer, including the Job Report of the desired job posting accessed and displayed by the job seeker computer, the employer computer including an employer Applicant Tracking System (ATS);
    a server computer connected to the network for generating, at the request of the employer computer using an ATS Platform located on the server computer, the plurality of Job Reports for the closely related positions each with the different skin including the Job Report of the desired job posting, wherein the ATS Platform is in interface to upload a text file associated with at least one job position with the employer ATS on the employer computer, wherein the ATS Platform comprises a video depository and edit module, a single video data entry module, a metrics module and a bulk video data entry module;
    wherein the network is the internet, the server computer is a webserver for producing HTML script, and the job seeker computer and the employer computer each include an HTML interface for reading the HTML script from the server computer;
    wherein each of the video depository and edit module, the single video data entry module, the bulk video data entry module, and the metrics module are each connected to a Job Report Generator for creating the plurality of Job Reports of the closely related positions each with the different skin including creating the Job Report of the desired job posting accessed and displayed by the job seeker computer;
    wherein the bulk video data entry module further includes an ATS Application Programmable Interface (API) and a XML document upload system, wherein a different ATS API is selected based on the different employer ATS and an associated feed location and access information, the ATS Application Programmable Interface (API) operable to, in response to a request received from the employer computer, retrieve information regarding new job offers located on the employer ATS and generate Job Reports based on the information regarding the new job offers;
    wherein the video depository and edit module includes a coding selection to generate, in response to a request from the employer computer, a code in a protocol for generating script for each Job Report, wherein the protocol is selected from a group consisting of video link, JS embed, Iframe, HTML, and HTML2, the video depository and edit module configured to display, to the employer computer, the script for each Job Report whereby the script can be copied to an alternate network location as desired by the employer to permit access to the Job Report from the alternate network location; and
    wherein the video depository and edit module includes an edit function with three segments, wherein at least one segment is skin information and wherein each of the different fields of at least one of the plurality of different skins is of one of four types as to data entry consisting of drop down option, typed text, HTML link, or an editing tools type text box; for entering different fields of at least one of the plurality of different skins edit an existing Job Report into the Job Report for the closely related position for the Job Report of the employer associated with the desired job posting of the job seeker.

* * * * *